United States Patent [19]
Payne et al.

[11] Patent Number: 5,288,312
[45] Date of Patent: Feb. 22, 1994

[54] FLUID SLUG FLOW MITIGATION AND GAS SEPARATION SYSTEM

[75] Inventors: Richard L. Payne, McKinney; Miroslav M. Kolpak, Plano, both of Tex.

[73] Assignee: Atlantic Richfield Company, Los Angeles, Calif.

[21] Appl. No.: 23,280

[22] Filed: Feb. 26, 1993

[51] Int. Cl.$^5$ .............................................. B01D 45/00
[52] U.S. Cl. ......................................... 96/158; 95/254; 95/266; 96/168; 96/193; 55/356
[58] Field of Search ................ 55/36, 46, 52, 55, 165, 55/1, 170–177, 189–190, 199, 206, 356; 210/188

[56] References Cited

U.S. PATENT DOCUMENTS

| | | | |
|---|---|---|---|
| 1,559,115 | 10/1925 | Marker et al. | 55/174 |
| 3,486,297 | 12/1969 | Eisinga | 55/170 X |
| 4,519,815 | 5/1985 | Buls et al. | 55/46 |
| 4,614,527 | 9/1986 | Reimann | 55/170 |
| 4,760,742 | 8/1988 | Hatton | 55/36 X |
| 5,158,579 | 10/1992 | Carstensen | 55/1 |

FOREIGN PATENT DOCUMENTS 0451905  8/1936  United Kingdom ................... 55/206

*Primary Examiner*—Charles Hart
*Attorney, Agent, or Firm*—Michael E. Martin

[57] ABSTRACT

A slug flow mitigation and gas separation device for well production fluids includes a primary fluid inlet conduit and a slug mitigation and gas separation chamber formed by a conduit section mounted generally vertically above the primary conduit. Spaced apart branch conduits interconnect the primary conduit with the slug mitigation and separation chamber and a check valve is interposed in the branch conduit disposed in the downstream direction of fluid flow through the device. Gas vent conduits are in communication with the slug mitigation and separation chamber for conducting separated gas away from the device.

5 Claims, 2 Drawing Sheets

FLUID SLUG FLOW MITIGATION AND GAS SEPARATION SYSTEM

BACKGROUND OF THE INVENTION

1. Field of the Invention

The invention pertains to a fluid slug flow mitigation and gas separation system particularly adapted for installation in oil production well fluid gathering and distribution systems.

2. Background

In the production of oil and gas from subterranean wells, a long-standing problem is that of dealing with the two-phase flow (gas and liquid) of the produced fluid which may vary considerably during the production life of a well. Two-phase fluid flow often results in so-called "slug" flow wherein alternate slugs of liquid and gas flow through the conduits leading to the primary oil and gas separation, treatment and pumping equipment. Slug flow is known to cause a variety of mechanical, process and corrosion problems in oil field conduit systems and equipment, especially in remote or offshore production systems where long, relatively large-diameter multi-phase fluid conducting pipelines are in service.

Several inventions have been developed to deal with fluid slug flow, including those described in U.S. patent application Ser. No. 07/941,615, filed Sep. 8, 1992 by Richard L. Payne and U.S. Pat. No. 4,708,793, issued Nov. 24, 1987 to R. L. Cathriner, et al, both assigned to the assignee of the present invention. Similar devices, known primarily as degasifiers, include that which is described in U.S. Pat. No. 4,746,335, issued May 24, 1988, to Jorg Reimann, et al. However, since slug flow mitigation systems are necessary, but usually unwanted, additions to oilfield fluid gathering, distribution and separation equipment, there has been a continuing need to develop slug mitigation equipment which is mechanically simple, requires little or no control system, contributes little or no pressure losses in the fluid gathering and distribution system, may be readily adapted to existing facilities and, of course, is relatively inexpensive to install. It is to these ends that the present invention has been developed with a view to providing a slug flow mitigation and gas separation system which is effective and meets the desiderata indicated herein as well as providing other advantages recognizable by those skilled in the art.

SUMMARY OF THE INVENTION

The present invention provides a unique fluid slug flow mitigation system or device particularly adapted for use in oilfield fluid gathering and distribution systems.

In accordance with one aspect of the present invention, a unique slug flow mitigation system is provided which may be interposed in an oilfield fluid gathering and transport piping system and is characterized by a section of primary fluid flow conduit having branch conduits which extend to a slug mitigation and gas separation chamber formed by a conduit section which may be mounted preferably directly above the primary fluid flow conduit and which is provided with one or more gas vent conduits leading to a gas distribution conduit. The slug mitigation and gas separation chamber is connected to the primary fluid flow conduit by a liquid return conduit having a check valve interposed therein. During the gas "bubble" cycle of slug flow the upper conduit section forming the aforementioned chamber will drain liquid accumulated from the previous liquid slug flow event back into the primary flow conduit. In this way the slug flow mitigation and gas separation chamber is primarily gas filled before the next liquid slug arrives. When a liquid slug does arrive at the slug flow mitigation device, a portion of the liquid slug flows into the chamber formed in the upper conduit section, usually filling the upper conduit section with such liquid. Some liquid carry-over into the gas vents may occur before liquid will drain from the upper conduit section back into the primary flow conduit.

The slug mitigation system of the present invention will alleviate or reduce the relatively long and fast-moving slugs which are the most damaging to fluid gathering and treatment systems. The system is compact, uncomplicated and easy to incorporate into an existing fluid gathering and distribution system, may be constructed out of standard and commercially available conduit members, and may not require a control system other than a conventional check valve. Advantages of the invention include provision of reduced fluid velocities in the flow conduits downstream of the device which results in reduced corrosion rates and stresses on the conduits, reduced size or capacity requirements for fluid handling equipment and facilities and reduced back pressure in the device and the flow conduits.

Those skilled in the art will recognize the above-described features and advantages of the present invention together with other superior aspects thereof upon reading the detailed description which follows in conjunction with the drawing.

DESCRIPTION OF PREFERRED EMBODIMENTS

Figure 1:
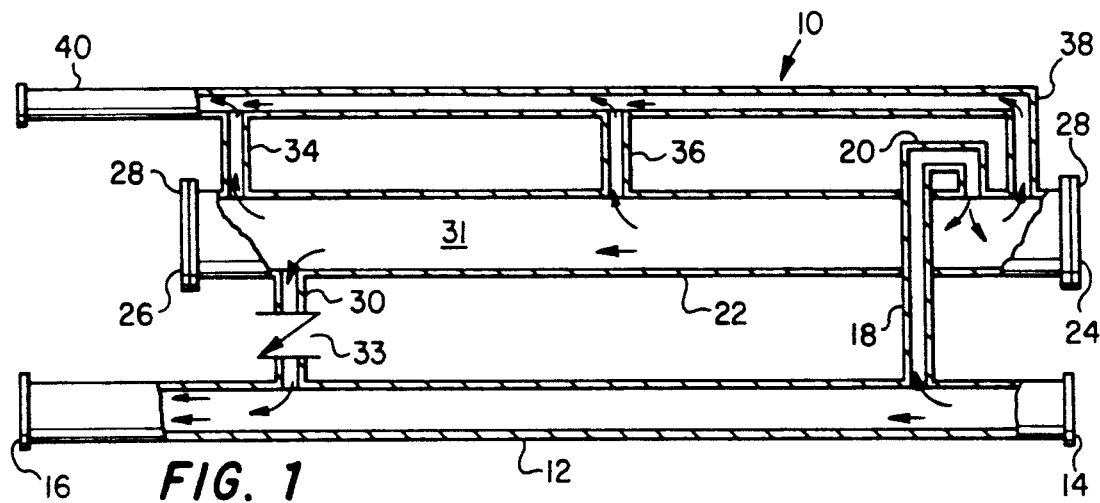
FIG. 1 is a side elevation, partially sectioned, of an improved slug flow mitigation device in accordance with the present invention.

In the description which follows, like parts are marked throughout the specification and drawing with the same reference numerals, respectively. The drawing figures are not necessarily to scale and certain features of the invention are shown in symbolic or schematic form in the interest of clarity and conciseness.

Referring to FIG. 1 there is illustrated one improved embodiment of a slug mitigation system or device in accordance with the present invention and generally designated by the numeral 10. The device 10 includes an elongated, mixed-phase, primary fluid flow conduit 12 having an inlet end 14 and a liquid discharge end 16. A generally vertically-extending branch conduit 18 is connected to the conduit 12 near the upstream or inlet end 14 and which preferably includes a reverse bend or elbow portion 20 which opens into a slug mitigation and gas separation chamber formed by a conduit section 22. The conduit section 22 is preferably a generally cylindrical member having opposed ends 24 and 26 which may be closed by conventional blind flanges 28 or other suitable cap means, for example. The conduit section 22 is further connected to the conduit 12 by way of a liquid return branch conduit portion 30 which is spaced from the conduit section 18 and opens into a slug mitigation and gas separation chamber 31 at a point spaced longitudinally from the conduit 18. A one-way or so-called check type valve 33 is interposed in the conduit 30 between the chamber 31 and the conduit 12 to prevent fluid flow from the conduit 12 into the chamber 31 through the branch conduit 30. One or more gas vent conduits 34, 36 and 38 intersect the conduit 22 and open into the chamber 31 along the top side of the conduit 22. Each of the vent conduits 34, 36 and 38 is in communication with a common gas discharge conduit or manifold 40 for conducting gas separated from liquid by the slug mitigation device 10 away from the device.

The objective of the device 10, when interposed in a fluid flow line or system that is subject to intermittent flow of slugs of liquid interposed between periods of primarily gas flow, is to dampen the severe fluctuations in the liquid and gas flow rates. In order to mitigate the flow of liquid slugs through a conduit, the device 10 should allow for the storage and draining of liquid during and after the period when the liquid slug enters the device. When a slug of liquid enters the device 10 at the conduit inlet 14, a portion of the liquid slug will flow through the branch conduit 18 and enter the chamber 31. Depending on the liquid slug flow rate, the chamber 31 may be filled with liquid before the slug of liquid has passed completely through the system or device 10. Gas entrained in the liquid slug or flowing through the system or device 10 before or after the liquid slug will flow from the chamber 31 through the vent conduits 34, 36 and 38 into the discharge conduit 40 and be suitably conducted therefrom to other portions of the well fluid flow gathering and distribution or treatment system. If the amount of liquid in the "slug" flowing through the device 10 is excessive, some liquid may flow out of the chamber 31 through the gas vent conduits 34, 36 and 38 and this liquid may be separated from the gas flow stream by a suitable separator, not shown, connected to the manifold 40, if required. After the liquid slug has passed through the conduit 12 and the conduit is again conducting primarily gas, liquid in the conduit section 22 will drain out of chamber 31 back through the branch conduit 30 and the check valve 33 into the conduit 12. The end 24 of the conduit section 22 is preferably supported above the conduit 12 at a slightly higher elevation than the end 26 so that liquid will easily drain from the chamber 31 into the liquid return conduit 30.

Figure 2:
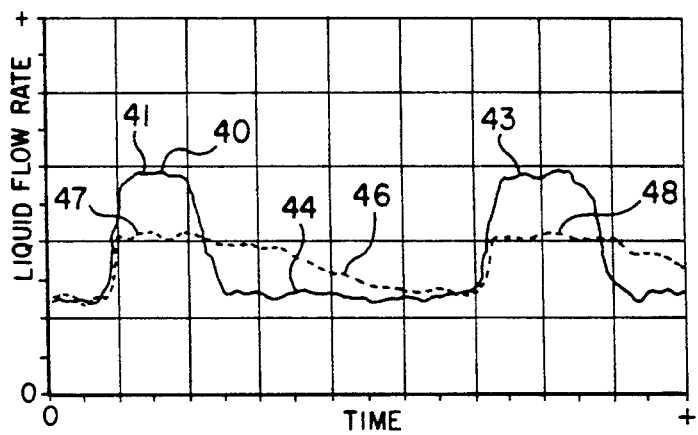
FIG. 2 is a diagram showing the effect of slug flow mitigation provided by the present invention.

Referring now to FIG. 2, there is illustrated a diagram which indicates generally the effect of the slug flow mitigation device 10 on relatively severe slug flow in a generally cylindrical conduit. The diagram of FIG. 2 indicates the general characteristics of slug flow of liquid wherein the abscissa is time and the ordinate is liquid flow rate. The solid line 40 in FIG. 2 indicates periodic severe liquid slugs flowing through the conduit as indicated by the peak flow rates 41 and 43 between which is interposed a relatively steady, significantly lesser liquid flow rate 44. The dashed line 46 in FIG. 2 indicates the effect of the slug mitigation device 10, for example, interposed in the conduit which was previously experiencing slug flow peaks 41 and 43. The device 10 is operable to reduce the slug flow rate by as much as fifty percent (50%) when comparing the peaks 41 and 43 with the reduced peaks 47 and 48 of the slug mitigated flow 46 and the steady state liquid flow rate 44. This amount of slug flow rate reduction is considered to be achievable with a slug flow mitigation device having the physical parameters described hereinbelow for the device illustrated in conjunction with FIGS. 4 and 5 of the drawing. Drawing FIG. 2 is not intended to be an exact quantified plot of liquid flow rate versus time, but generally indicates the magnitude of slug flow reduction that is achievable with the mitigation device of the present invention.

The construction of the device 10 may be carried out using conventional pipe rated for the pressure and other operating conditions of the fluid system to which the device is connected. The conduit sections 12, 18, 22, 30, 34, 36, 38 and 40 may be provided using conventional pipe rated for the service conditions to which the system 10 will be installed. The device 10 reduces the size of damaging liquid slugs without increasing the size of other components of the fluid handling facilities that are built to receive fluids from an oil well or other fluid producing source. By providing the device 10 in a fluid handling system, significant cost savings may be realized since the other components of the fluid handling system and related facilities will not be required to be built to withstand substantial slug flow. The device 10 will also function as a liquid-gas separator, as will be appreciated from the discussion herein.

Figure 4:
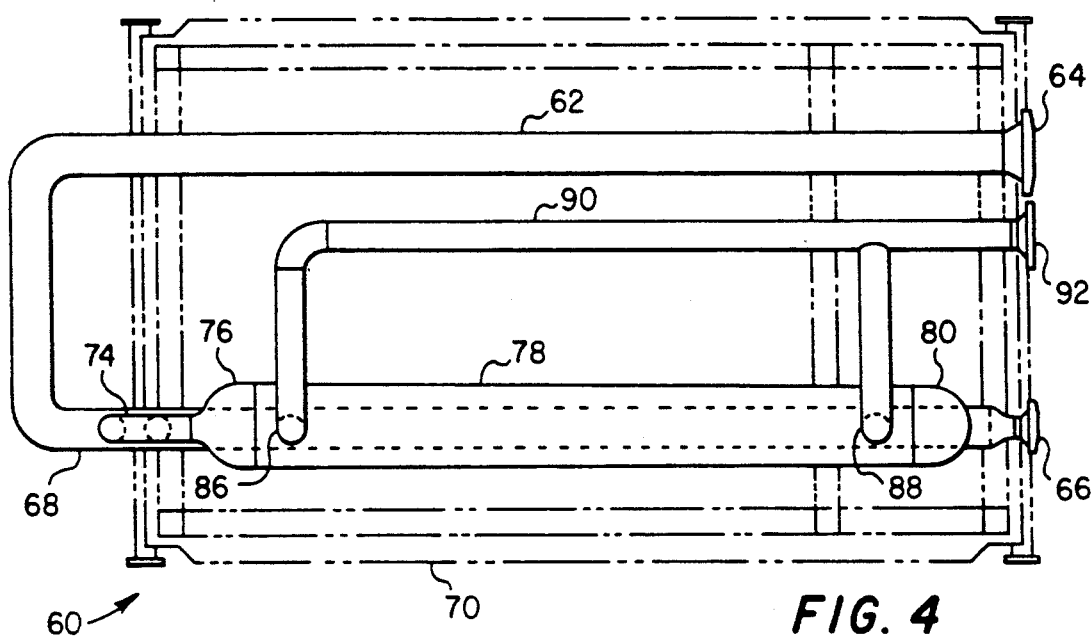
FIG. 4 is a plan view of an alternate embodiment of a slug flow mitigation system or device in accordance with the present invention.
Figure 5:
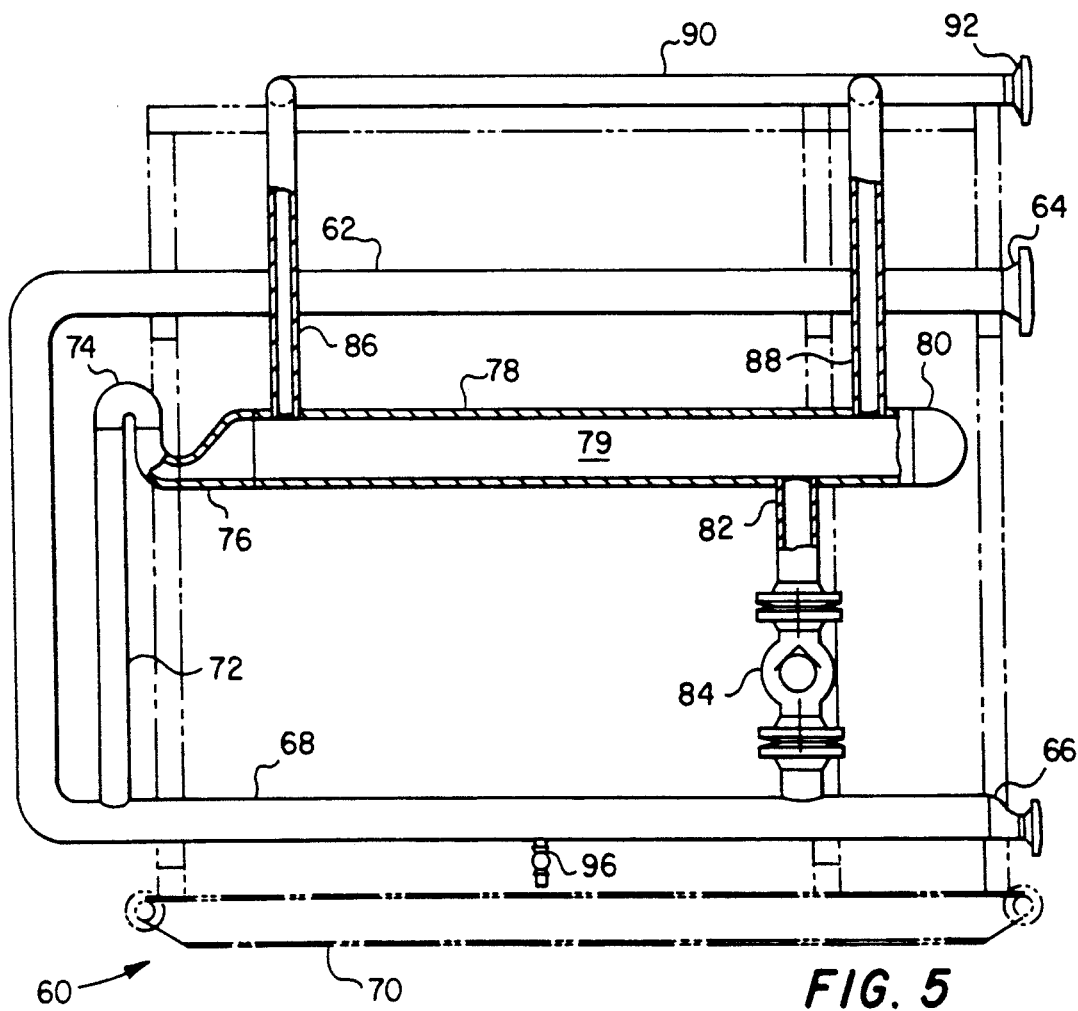
FIG. 5 is an elevation view of the embodiment of the system or device illustrated in FIG. 4.

Referring now to FIGS. 4 and 5, an alternate embodiment of a slug flow mitigation device in accordance with the present invention is illustrated and generally designated by the numeral 60. The slug mitigation device 60 includes a primary fluid flow conduit 62 which has an inlet end 64 for connection to a mixed phase fluid flow conduit, not shown, and a primarily liquid discharge end 66 for discharging liquid to a transport conduit, also not shown. The conduit 62 has a generally horizontal portion 68 extending along and directly above a support skid 70. The skid 70 is also provided with suitable framing, shown in FIGS. 4 and 5, for supporting the conduits of the device 60.

A slug receiving branch conduit 72 extends upward from the section 68 of the primary fluid flow conduit 62 to a reverse bend elbow 74 which is connected to an eccentric reducer fitting 76 as illustrated in FIG. 5. The reducer fitting 76 is operably connected to a slug mitigation and gas separation chamber 79 formed by a conduit section 78 which is closed at its opposite end by a head or flange portion 80. A liquid discharge conduit is connected to the mitigation and separation chamber of the conduit section 78 as indicated by numeral 82 and having interposed therein a suitable check valve 84. The conduit 82 descends generally vertically to the primary fluid flow conduit section 68 for returning liquid flow to the conduit section from the chamber 79. Gas vent conduits 86 and 88 extend upwardly from the conduit section 78 and are in communication with chamber 79 to receive gas separated from liquid in the chamber 79 and for conducting gas to a gas discharge manifold 90 having a suitable flanged discharge end 92 for connection to a gas transport conduit, not shown. The arrangement of the device 60 is substantially like that of the device 10, the major difference being that the connections to the inlet and outlet of the primary fluid flow conduit 62, 68 and the connection to the gas vent manifold are disposed at the same end of the skid 70. The system 60 may also include a suitable drain valve 96 connected to the conduit section 68 as indicated in FIG. 5.

By way of example, the system 60 may, for a degassing application, be adapted to handle fluid flow in the amount of about 20,000 barrels per day (42 U.S. gallons per barrel) liquid flow and 24 MM standard cubic feet per day gas flow at a pressure of about 300 psig and 120° F. The dimensions of the skid 70 may be approximately twelve feet in length by eight feet in width and the nominal pipe sizes of the conduit sections of the system 60 may be as follows. Assuming ASTM class A53, grade B pipe, a nominal pipe size for the conduit section 62–68 is 6.0 inches, the nominal diameter of the mitigation and gas separation conduit section 78 is 12.0 inches. The gas vent conduits 86, 88 and 90 are nominal 4.0 inch diameter and the conduit sections 72 and 82 are nominal 4.0 inch diameter and 6.0 inch diameter, respectively. The discharge end 66 of the conduit section 68 may be characterized as a 6.0 inch by 3.0 inch diameter eccentric reducer. Flanges connected to the ends of the conduits 62, 68 and 90, as illustrated, may be nominal 600 pound weldneck type. Those skilled in the art will recognize that substantially all of the components of the systems 10 and 60 may be made from commercially available piping and fabricated using conventional welding and similar fabrication techniques.

Figure 3:
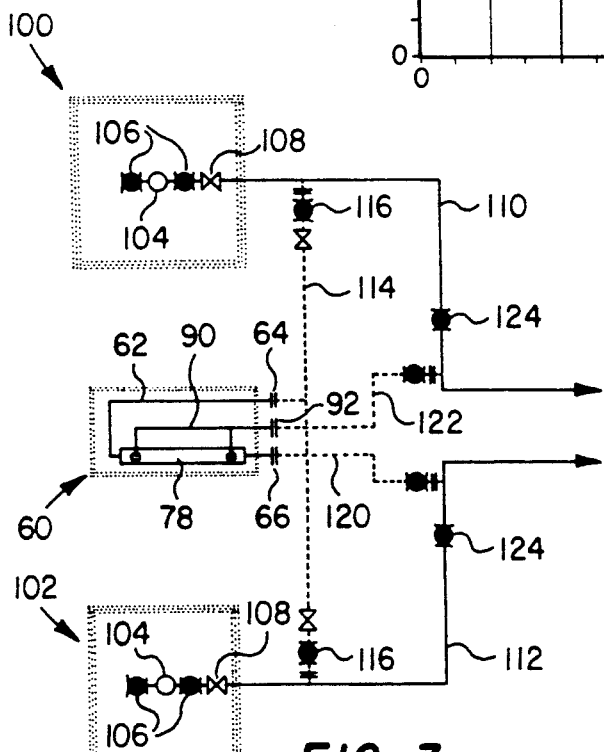
FIG. 3 is a schematic diagram of a multiple well fluid gathering and distribution system which includes the improved slug flow mitigation device of the present invention interposed therein.

Referring now to FIG. 3, there is illustrated one arrangement wherein the slug mitigation system 60 may be interposed in an oil field fluid gathering and distribution system. FIG. 3 shows two spaced-apart oil wells 100 and 102 having conventional wellheads 104, wing valves 106 and surface safety valves 108, respectively. The production flow lines 110 and 112 of the respective wells lead to suitable fluid receiving and treating facilities, not shown. In order to mitigate slug flow from each of the wells 100 and 102, the system 60 is interposed in the fluid flow lines, as illustrated, by providing a common line or manifold 114 connected to each flow line 110 and 112 and having suitable control valves 116 interposed therein, as illustrated. The manifold 114 is connected to the inlet end 64 of the primary fluid flow conduit 62, 68 and the discharge end 66 of the conduit is connected by way of a suitable conduit 120 to the flow line 112. In similar manner, the gas discharge manifold 90 is connected to a gas discharge conduit 122 which is connected to the flow line 110 downstream of the connection between the conduit 114 and the flow line 110. Suitable block (open or shut) valves 124 are interposed in each of the lines 110 and 112, as illustrated. Accordingly, the existing flow line arrangement of the wells 100 and 102 may be modified by commingling the flow from each well in the manifold 114 and causing the flow from each well 100 and 102 to pass through the slug mitigation and gas separation system 60 whereupon substantially gas free liquid flow is discharged by way of the conduit 120 through the flow line 112 to liquid receiving and treatment facilities. In like manner, substantially liquid-free gas is conducted by way of the conduit 90 and conduit 122 to the flow line 110 downstream of the shut-off valve 124 so that this line now carries substantially only gas to the fluid handling and treatment facilities aforementioned. Thanks to the arrangement of the slug mitigation and gas separation system of the present invention, one or several wells may be connected to the system and slug flow from these wells may either be substantially reduced or completely eliminated and primary gas separation accomplished at or near the well site.

Although preferred embodiments of a slug flow mitigation and gas separation system have been described herein in some detail, those skilled in the art will recognize that various substitutions and modifications may be made to the systems or devices described without departing from the scope and spirit of the invention as recited in the appended claims.

What is claimed is:

1. A slug flow mitigation device adapted to be interposed in a flow conduit for mixed phase, gas and liquid, fluid flow, said device comprising:

a primary fluid flow conduit for conducting slugs of liquid and gas, said primary fluid flow conduit extending in a generally horizontal direction;

a conduit section forming a slug flow mitigation and gas separation chamber disposed generally vertically spaced above said primary fluid flow conduit for receiving liquid slug flow and gas flow from said primary fluid flow conduit;

a branch conduit extending from said primary fluid flow conduit to and in communication with said chamber for discharging liquid and gas into said chamber;

a liquid return conduit extending between said conduit section and said primary fluid flow conduit and in communication with said chamber for returning liquid to said primary fluid flow conduit;

at least one gas vent conduit connected to said chamber for conducting gas away from said device; and check valve means interposed in said liquid return conduit and operable to prevent fluid flow from said primary fluid flow conduit to said chamber through said liquid return conduit.

2. The device set forth in claim 1 wherein:

said branch conduit and said liquid return conduit are spaced apart along said primary fluid flow conduit.

3. The device set forth in claim 1 wherein:

said branch conduit is connected to said conduit section forming said chamber by a reverse bend conduit portion opening into said chamber along an upper side of said conduit section.

4. The device set forth in claim 1 wherein:

said conduit section is disposed to slope downwardly in the direction of said liquid return conduit from said branch conduit.

5. A slug flow mitigation and gas separation device adapted to be interconnected to plural fluid-producing wells wherein said wells each include a flow line, a common line interconnecting said flow lines and adapted to be connected to said device, said device being characterized by:

a primary fluid flow conduit for conducting slugs of liquid and gas received from said common line of said wells, said primary fluid flow conduit extending in a generally horizontal direction and having an inlet end disposed at one end of said device;

a conduit section forming a slug flow mitigation and gas separation chamber disposed generally vertically spaced above said primary fluid flow conduit for receiving liquid slug flow and gas flow from said primary fluid flow conduit;

spaced apart conduits interconnecting said primary fluid flow conduit and said conduit section and in flow communication with said chamber for discharging liquid and gas into said chamber and for returning liquid from said chamber to said primary fluid flow conduit, respectively;

at least one gas vent conduit connected to said chamber for conducting gas away from said device and having an outlet end disposed at said one end of said device; and said primary fluid flow conduit having an outlet end disposed at said one end of said device whereby said device may be connected to said common line, a gas discharge flow line and a liquid discharge flow line for discharging gas separated in said device and slug mitigated liquid flow.

* * * * *